United States Patent
Reed et al.

[11] Patent Number: 5,845,095
[45] Date of Patent: Dec. 1, 1998

[54] METHOD AND APPARATUS FOR STORING AND RESTORING CONTROLLER CONFIGURATION INFORMATION IN A DATA COMMUNICATION SYSTEM

[75] Inventors: Douglas D. Reed, Meridianville; Charles E. Polk, Jr., Athens; Richard A. Gautreaux, II, Cullman, all of Ala.

[73] Assignee: Motorola Inc., Schaumburg

[21] Appl. No.: 505,425

[22] Filed: Jul. 21, 1995

[51] Int. Cl.⁶ .................................................. G06F 13/00
[52] U.S. Cl. .......................................................... 395/283
[58] Field of Search ........................... 395/200.5, 200.51, 395/200.52, 200.53, 200.54, 200.74, 282–284

[56] References Cited

U.S. PATENT DOCUMENTS

| | | | |
|---|---|---|---|
| 5,166,939 | 11/1992 | Jaffe et al. | 371/40.4 |
| 5,426,421 | 6/1995 | Grey | 395/200.53 |
| 5,452,301 | 9/1995 | Klingman | 370/419 |
| 5,495,575 | 2/1996 | Hermann et al. | 395/200.54 |
| 5,500,864 | 3/1996 | Gonia et al. | 371/53 |
| 5,530,831 | 6/1996 | Akiyama et al. | 711/114 |
| 5,592,342 | 1/1997 | Hall et al. | 360/48 |
| 5,640,592 | 6/1997 | Rao | 395/825 |
| 5,673,381 | 9/1997 | Huai et al. | 395/180 |

*Primary Examiner*—Robert B. Harrell
*Assistant Examiner*—David M. Oredovitz
*Attorney, Agent, or Firm*—Nancy R. Gamburd

[57] ABSTRACT

A data communications system (100) has a controller (214) for managing the system containing a plurality of data communications devices (224). The data communication devices (224) have memory allocated for storing controller configuration information in order to serve as distributed controller backup units (226). If the controller (214) is replaced by a replacement controller (228), the controller configuration information is restored to the replacement controller (228) which receives the controller configuration information previously stored in the memory of the data communication devices serving as distributed controller backup units. The controller configuration information is stored in a page format (390) having identification (391), controller configuration information data (392), and error detection information (393).

17 Claims, 8 Drawing Sheets

PRIOR ART

```
typedef struct
{
410  char  pni;                    /* page number identification */
420  char  ip_address[4];
430  char  system_contact[42];
440  char  system_name[38];
450  char  system_location[42];
460  char  checksum;
}
```

*FIG. 5*

```
Motorola ISG    Device: System Management Controller
  DAS 925       Revision: 1.0                           SN:    011FA13A000000EF
Copyright 1992  Shelf/Slot: 01/18
                Time: 14:04:56    Date: 05-12-94
```

──────────────ADDRESS/ID MENU──────────────

| | |
|---|---|
| Serial Number | 011FA13A000000EF |
| Ethernet Address | 00C0D80000B8 |
| IP Adress | 192.24.128.254 |
| Default Gateway Address | 0.0.0.0 |
| Subnet Mask | 255.255.255.0 |
| System Name | no system name |
| System Location | no system location |
| System Contact | no system contact |
| SNMP Read Community String | public |
| SNMP Write Community String | private |

} 500

Enter IP Adress
192.24.128.254
Cancel

──────────────Utility Options──────────────

| <System> | Time/Date | Switch LIU | Password |
| Adress/ID | Terminal | Secure Srv | |

*FIG. 6*

| STX | LEN | ADD | RID | EC1 | in which:

STX  Start of Text
LEN  Length of frame
ADD  Address Byte
RID  Request Identification
EC1  Error Check

*FIG. 8A*

| STX | LEN | ADD | PID | CBUPC | EC1 | in which:

STX    Start of Text
LEN    Length of frame
ADD    Address Byte
PID    Present Identification
CBUPC  CBU page count
EC1    Error Check

| CBU System Slot Location | Storage Capacity of each CBU in Controller Configuration Pages | PNI 1 | PNI 2 | PNI 3 | PNI 4 | PNI 5 |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 7 | 2 | 2 | 1 | 1 | 1 |
| 7 | 0 | 0 | 0 | 0 | 0 | 0 |
| 8 | 0 | 0 | 0 | 0 | 0 | 0 |
| 9 | 3 | 0 | 0 | 1 | 1 | 1 |
| 10 | 3 | 1 | 1 | 1 | 0 | 0 |
| 11 | 3 | 1 | 0 | 0 | 1 | 1 |
| 12 | 0 | 0 | 0 | 0 | 0 | 0 |
| 13 | 0 | 0 | 0 | 0 | 0 | 0 |
| 14 | 0 | 0 | 0 | 0 | 0 | 0 |
| 15 | 3 | 0 | 1 | 1 | 1 | 0 |
| 16 | 2 | 1 | 0 | 0 | 0 | 1 |
| 17 | 2 | 0 | 1 | 1 | 0 | 0 |
| 18 | 1 | 0 | 0 | 0 | 1 | 0 |
| 19 | 1 | 0 | 0 | 0 | 0 | 1 |
| 20 | 1 | 1 | 0 | 0 | 0 | 0 |
| 21 | 1 | 0 | 1 | 0 | 0 | 0 |
| 22 | 0 | 0 | 0 | 0 | 0 | 0 |
| 23 | 0 | 0 | 0 | 0 | 0 | 0 |
| 24 | 0 | 0 | 0 | 0 | 0 | 0 |
| 25 | 0 | 0 | 0 | 0 | 0 | 0 |
| 26 | 0 | 0 | 0 | 0 | 0 | 0 |
| 27 | 0 | 0 | 0 | 0 | 0 | 0 |
| 28 | 0 | 0 | 0 | 0 | 0 | 0 |
| 29 | 3 | 0 | 0 | 1 | 1 | 1 |
| 30 | 3 | 1 | 1 | 1 | 0 | 0 |
| 31 | 3 | 1 | 0 | 0 | 1 | 1 |
| 32 | 3 | 0 | 1 | 1 | 1 | 0 |
| 33 | 3 | 1 | 1 | 0 | 0 | 1 |
| 34 | 0 | 0 | 0 | 0 | 0 | 0 |
| 35 | 9 | 2 | 1 | 2 | 2 | 2 |
| 36 | 0 | 0 | 0 | 0 | 0 | 0 |

*FIG. 9* in which:

STX   Start of Text
LEN   Length of frame
ADD   Address Byte
CRCC  Controller Request Controller Configuration
EC1   Error Check

*FIG. 10A* in which:

STX   Start of Text
LEN   Length of frame
ADD   Address Byte
DPCC  Device Present Controller Configuration
MORE  1= device has additional pages
       0= last page
PAGE  128 Byte page of controller configuration sent from device
EC1   Error Check

*FIG. 10B* in which:

STX   Start of Text
LEN   Length of frame
ADD   Address Byte
CPCC  Controller Present Controller Configuration
MORE  1= device has additional pages
       0= last page
PAGE  128 Byte page of controller configuration sent from device
EC2   Error Check

METHOD AND APPARATUS FOR STORING AND RESTORING CONTROLLER CONFIGURATION INFORMATION IN A DATA COMMUNICATION SYSTEM

FIELD OF THE INVENTION

This invention relates in general to data communication systems, and more particularly, to a method and apparatus for storing and restoring controller configuration information in a data communication system.

BACKGROUND OF THE INVENTION

In a data communication system having a controller for managing a variety of data communication devices ("DCDs"), the controller memory typically contains information about both the DCDs and the controller. For example, the controller memory may have DCD information such as baud rate, parity, flow control and other information for each DCD. Such DCD information is referred to herein as "device configuration information". Information about the controller, referred to herein as "controller configuration information", may include data such as the various network addresses of the controller, control port baud rates, parity settings, textual information (such as a remote unit's physical location) and other information related to the controller.

As is the case with any component of a data communication system, the controller may need to be replaced for maintenance. In one prior art method, the controller is replaced and the system is restarted. This method, however, typically requires the disconnection of all DCDs connected to the system, resulting in a disruption of communication. It is highly desirable, therefore, to replace the controller without interrupting active data communication connections.

As is known in the prior art, when a current controller is replaced with a replacement controller while the data communication system is operating, the new (or replacement) controller can restore DCD configuration information to the non-volatile memory of the new controller by requesting each DCD to transmit its device configuration information. There is no equivalent way, however, for the new controller to obtain the controller configuration information from the now replaced, previous controller.

One prior art method to restore the controller configuration information in the new controller (previously contained in the previous controller) consists of transferring and storing the controller configuration information in a network component, such as a computer or workstation. When the controller is replaced, the controller configuration information is transferred and loaded from the network component into the new controller. This method, however, requires the use of additional equipment, such as a network component, and such corresponding additional cost may be competitively disadvantageous. Further, the use of the network component to store information may be unsatisfactory if the network component is disconnected or otherwise becomes inoperable.

Another prior art method is to store the controller configuration information in a dedicated controller backup unit (CBU) located within the data communications system. If the amount of controller configuration information exceeds the storage capacity of the dedicated CBU, however, some of the controller configuration information may be lost. Because such loss of controller configuration information may cause faulty operation of the controller, the dedicated CBU method may not always satisfy the requirements of the data communications system.

Accordingly, a need remains for an apparatus and method for storing controller configuration information, without additional and possibly expensive network equipment or a dedicated CBU, and for restoring such controller configuration information in a replacement controller during active data communication.

DETAILED DESCRIPTION OF THE INVENTION

Figure 1:
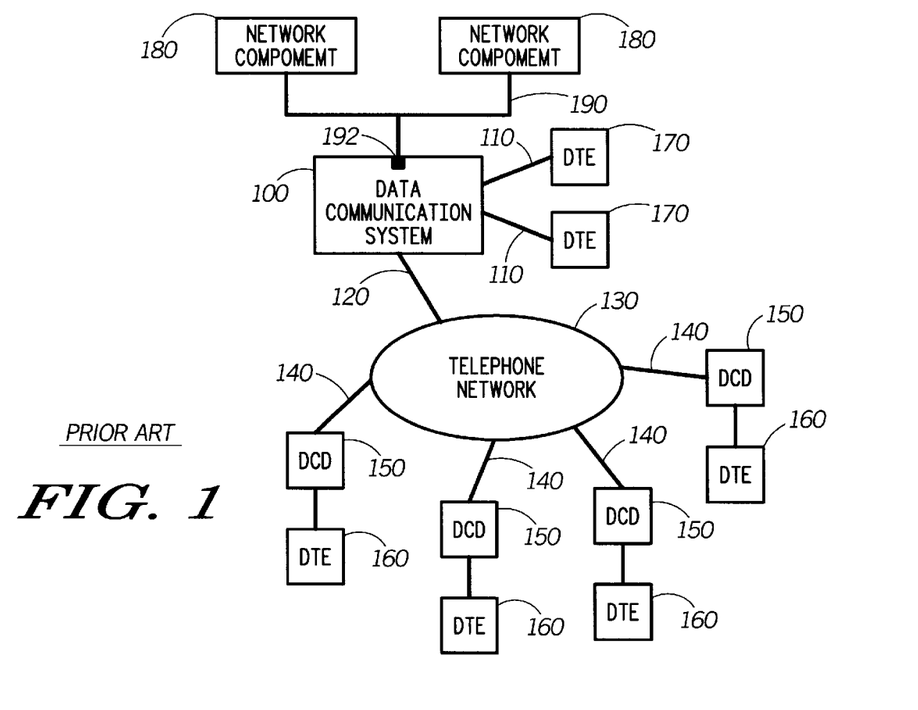
FIG. 1 is a block diagram of a data communication system connected to a telephone network.

FIG. 1 is a block diagram of a data communication system 100 connected to a telephone network 130. The data communication system 100 includes a plurality of local data communications devices (DCDs) (illustrated in FIG. 2) connected to a telephone network 130, such as a public switched telephone network, private network, or similar network. The telephone network 130 is further connected through connections 140 to a plurality of remote data terminal equipment ("DTEs") 160 through a plurality of remote DCDs 150. Connections 140 from the telephone network may be analog connections, digital connections, or other connections available from telephone network service providers. Local DTEs 170 are coupled over local connections 110, such as an RS232 interface, to the local DCDs of the data communication system 100, to communicate over the telephone network 130 to the various remote DTEs 160. Network components 180, such as workstations or personal computers, are connected on a local area network ("LAN") 190 to the data communication system 100 via a configuration port 192. The network components 180 may direct the data communication system 100 through a system operator of the LAN 190 through system protocols such as SNMP (Simple Network Management Protocol).

The data communication system 100, for example, may be a Motorola DAS 925 Wide-Area Network Bandwidth Management System or another equivalent data communication system. The data communications system 100 may have a variety of local DCDs (illustrated in FIG. 2), such as analog and digital modems, terminal adapters, hybrid modems, line interface units, and other similar devices. In order for the system operator of the LAN 190 to direct and observe the operation of the local DCDs, the data communications system 100 should have means for controlling and monitoring the local DCDs. In addition, the data communications system 100 should be reliable, and any loss of data connections should be for a minimum, if any, period of time. Accordingly, it is highly desirable to provide a means to maintain active data connections when various components (such as DCDs and the controller) of the data communication system 100 are replaced, added or removed. Maintaining data connections may be accomplished by "hot swapping"; i.e., replacing components when the data communication system 100 is active and powered.

Figure 2:
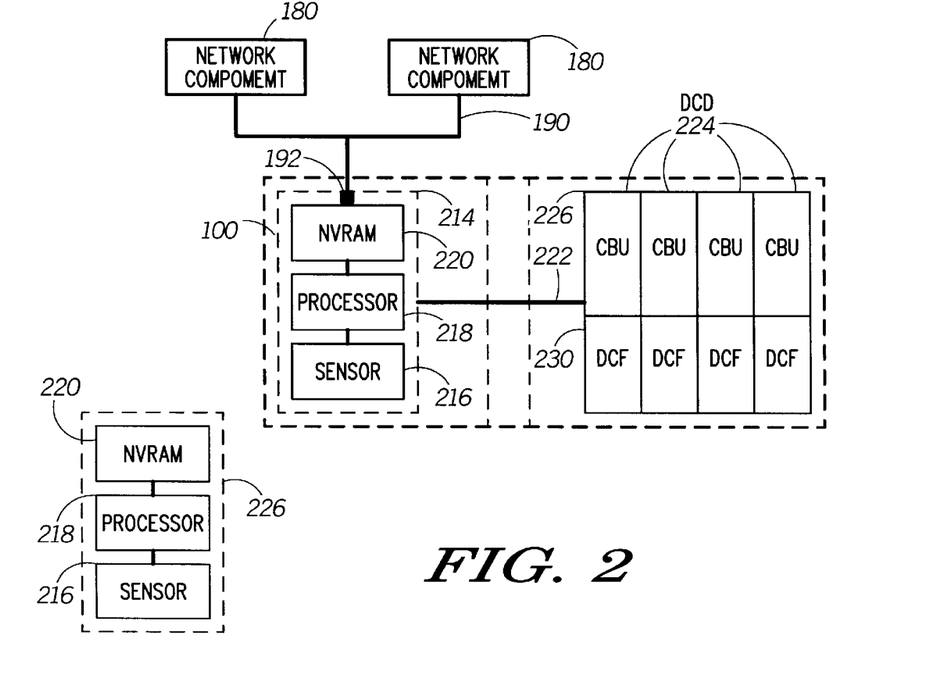
FIG. 2 is a block diagram illustrating a data communication system in accordance with the present invention.

FIG. 2 is a block diagram illustrating a data communication system 100 having an embodiment of the present invention. FIG. 2 illustrates components of the data communications system 100 connected to the LAN 190 via the configuration port 192. The configuration port 192 is also connected to a controller 214 to couple the controller 214 to the various network components 180. The controller 214 has a processor 218, a sensor 216, and a non-volatile random access memory (NVRAM) 220, connected to each other via a processor bus (not shown). The NVRAM 220 typically consists of battery backed-up random access memory and is also referred to as a second random access memory. A communications bus 222 connects the controller 214 to each of the local DCDs 224 of the data communications system 100. The DCDs 224 provide for a data communications function (DCF) 230, such as modem operation, and in the preferred embodiment may also provide for function as a controller backup unit (CBU) 226 for backing up the controller, which may be implemented as memory circuitry referred to as a first random access memory. In the preferred embodiment, such backup is utilized when the controller 214 is replaced by another controller, shown as a replacement controller 228 in FIG. 2. The replacement controller 228 may be identical to the controller 214, or may have differences such as modified hardware or software upgrades. These various controllers may be implemented using a microprocessor such as a Motorola 68302, memory components, interface circuits, or other components.

Components of the controller 214 and the CBUs 226 serve as elements for storing controller configuration information and restoring controller configuration information when the controller 214 is removed and replaced by a replacement controller 228. Controller configuration information is typically required for operation of data communication systems and consists of information such as the controller's network address, control port baud rates, parity settings, textual information, and other information. As discussed in greater detail below, when the data communications system 100 is placed in operation (or powered up), in accordance with the present invention, the controller creates a map of the CBUs 226, determining what memory capacity is available in each DCD 224. The controller organizes the controller configuration information into a page format, and transfers pages of the controller configuration information to the various CBUs 226 of the DCDs 224, thereby distributively storing (and backing-up) controller configuration information pages in the CBUs 226.

Also as discussed in greater detail below, when the controller 214 is replaced by the replacement controller 228, the CBUs 226 serve to restore the (stored) controller configuration information to the replacement controller 228. The replacement controller requests controller configuration information pages from each of the CBUs 226 and the sensor 216 determines (senses) the validity of each such page. If a set of valid controller configuration information pages is retrieved from the CBUs 226, the set is sequentially stored in the NVRAM 220 of the replacement controller 228. Because the replacement controller would then have the controller configuration information, the replacement controller is activated and the data communication system becomes fully operational. If, however a set of valid controller configuration information pages is not obtained when retrieving information from the CBUs 226, then predetermined (or "factory") default controller configuration information pages are combined with the valid controller configuration information pages to form a usable set of controller configuration information. The replacement controller 228 is then activated employing the usable set, but may then have some controller configuration information that is not identical to the information previously contained in the controller 214.

Figure 3:
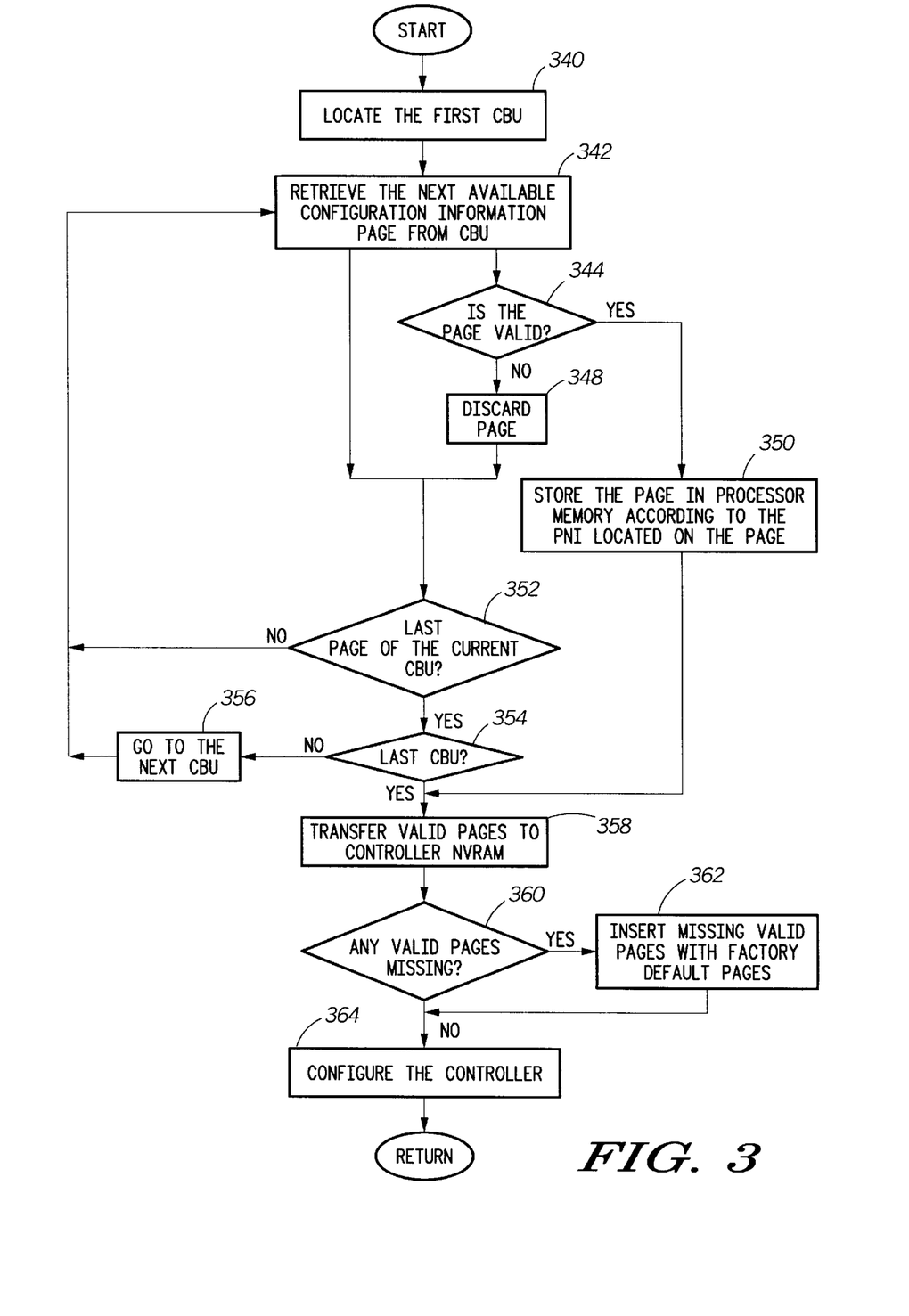
FIG. 3 is a flow chart illustrating the method of restoring controller configuration information in accordance with the present invention.
Figure 8A:
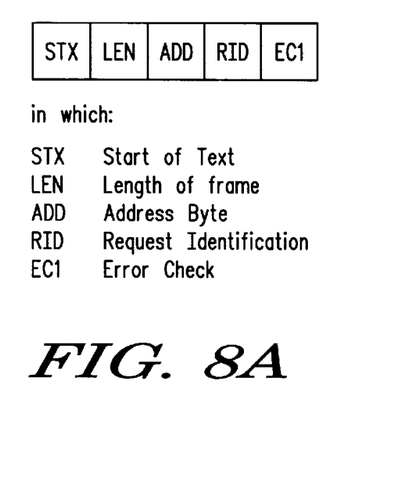
FIG. 8A illustrates the structure of a request identification protocol frame in accordance with the present invention.
Figure 8B:
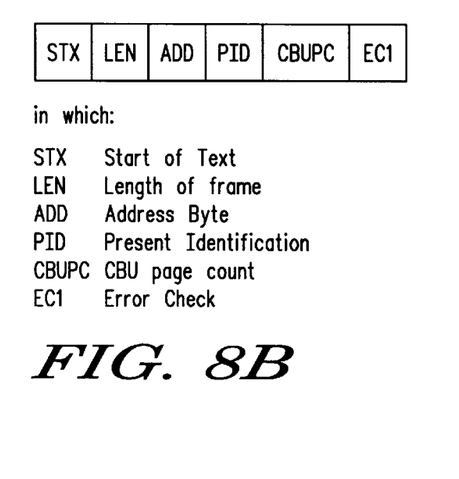
FIG. 8B illustrates the structure of a present identification protocol frame in accordance with the present invention.

FIG. 3 is a flow chart illustrating the method of restoring controller configuration information in accordance with the present invention. In step 340, the (replacement) controller 228 locates a first CBU 226 having a controller configuration information page, where each page has 128 bytes. The controller 228 retrieves the controller configuration information page over communications bus 222, which is then transferred to the sensor 216, step 342. Details of the protocol and framing structures used to accomplish the transfer are illustrated in FIG. 8 and are discussed below. The sensor 216 portion of the controller 228 then determines (or senses) the validity of the controller configuration information page through the use of any error detection or error correction methodology, such as a cyclic redundancy check or a parity check, step 344.

In the preferred embodiment, the sensor 216 portion of the controller 228 determines the validity of a controller configuration information page by using a checksum algorithm. The checksum validity algorithm is comprised of the following steps: (1) forming the sum of the 128 bytes (add byte 1, byte 2, . . . , byte 128); and (2) saving the least significant byte of the sum. If the least significant byte is zero (all eight bits are zero), then the sensor has detected (sensed) a valid controller configuration information page, thereby completing step 344. If the page is not valid, the page is discarded (step 348). Valid controller configuration information pages are stored sequentially in processor memory (step 350). If the retrieved page is not the last page available in the current CBU, then the retrieving and validity determining processes (steps 342 and 344) are repeated for the next available page of the current CBU (step 352). If, however, the retrieved page is the last page stored in the current CBU, then the next CBU (if any) is located (steps 354 and 356) and information is retrieved from the first page of this next CBU, with the repetition of these retrieving and sensing processes (steps 342, 344, 348, 350, 352, 354 and 356).

Continuing to refer to FIG. 3, when the last page of the last CBU has been processed (steps 352 and 354), the valid controller configuration pages stored sequentially in controller memory are transferred to NVRAM 220 (step 358). If there is a complete set (none are missing) of valid controller configuration information pages, the controller configuration information is restored and the information contained in the replacement controller 228 is the same as the information previously contained in the controller 214 (steps 360 and 364). If one or more controller configuration information pages are missing, however, the one or more missing pages are replaced by predetermined or factory default controller configuration information pages (step 362). The replacement controller 228 would then have an adjusted set of controller configuration information, which may not be the same as the complete set previously contained in the controller 214. Because the adjusted set has no missing pages, the controller is now configured (step 364).

Figure 4:
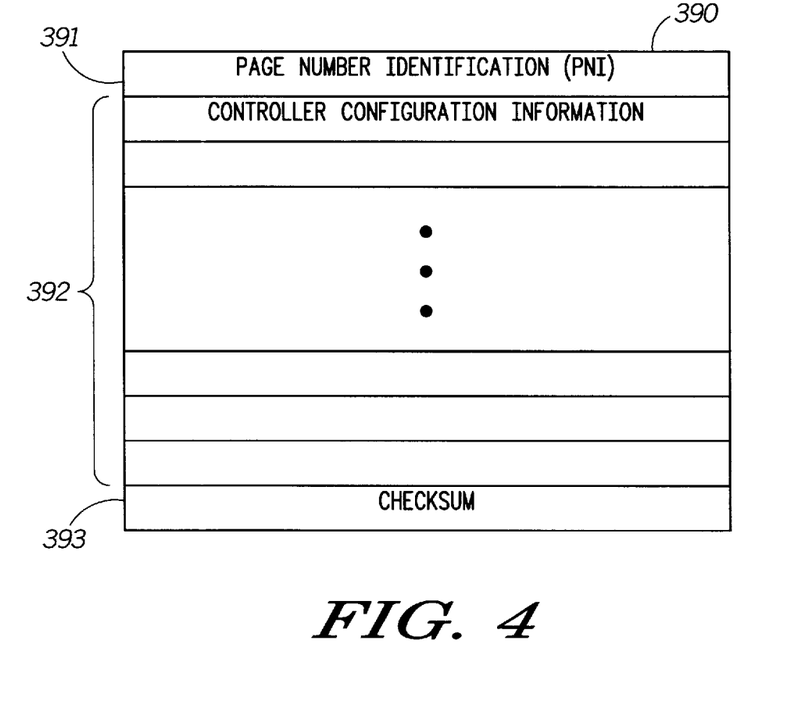
FIG. 4 is a diagram illustrating a structure of a controller configuration information page in accordance with the present invention.

FIG. 4. illustrates the preferred structure of a controller configuration information page 390. Controller configuration information pages are designed to identify each page, to store data in a predefined format, and to determine if an error is made when pages are transferred from a CBU (DCD memory) to controller NVRAM. Each page has a capacity or length of 128 bytes in the preferred embodiment, but could also have any predetermined length. The first byte is an identification 391 such as a page number identifier (PNI), which is used to identify the page and to determine a storage location in the controller memory. In the preferred embodiment, the pages are numbered sequentially (using the PNI location in byte 1) from 1 to n, where n is the number of pages needed to store a complete set of controller configuration information. The next 126 bytes contain formatted controller configuration information data 391. Since the data representing controller configuration information may have various lengths, the number of bytes for each set of data representing information may not be the same. For example, an IP address may require four bytes, while a system contact may require forty two bytes.

Continuing to refer to FIG. 4, the checksum (or other error detection or correction value) 393 is stored as byte 128. A checksum value is generated using a checksum generating algorithm comprised of the following steps:

(1) form the sum of the 127 bytes (add byte 1, byte 2, ..., byte 127);
(2) save the least significant byte of the sum;
(3) invert the least significant byte; and
(4) form a checksum byte by adding a binary one to the inverted least significant byte.

This checksum byte (or other error detection or correction data) 393 is then used as the 128th byte of the controller configuration information page. The bytes between the PNI byte and the checksum byte have configuration control information. If configuration controller information is changed during the course of operation, it may be necessary to regenerate a controller configuration information page, using the same steps as the initial generation process.

Figure 5:
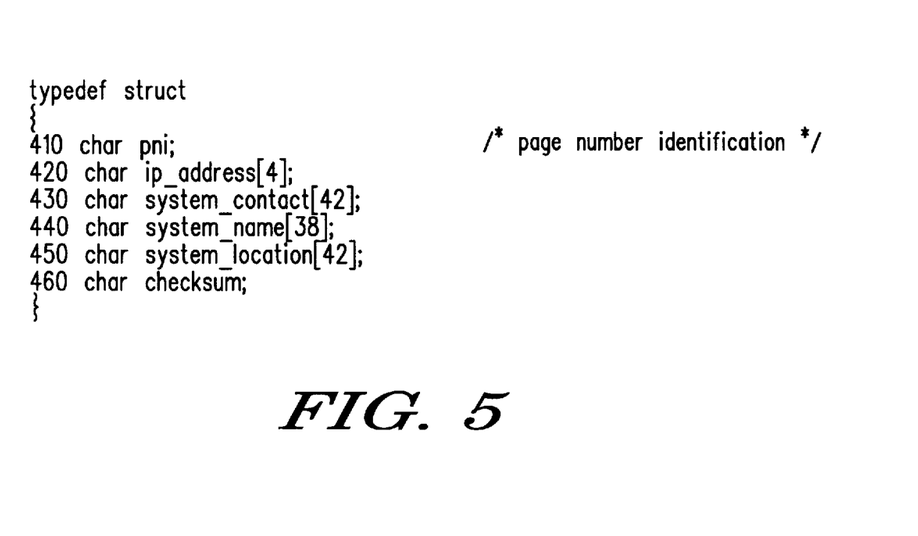
FIG. 5 illustrates a computer program used to generate a controller configuration information page in accordance with the present invention.

FIG. 5 illustrates a computer program utilized to generate each page of controller configuration information, written in the "C" computer language. Each line of code is used to generate a portion of the 128 bytes of the page, and the numbers in brackets refer to the number of bytes used, and if no number appears in brackets, then one byte is used. As shown in FIG. 5, line 410 generates the PNI of byte 1; line 420 generates an Internet Protocol (IP) address, using 4 bytes; line 430 generates system contact information, using 42 bytes; line 440 generates system name information, using 38 bytes; line 450 generates system location information, using 42 bytes; and line 460 generates a checksum value, using 1 byte.

Figure 6:
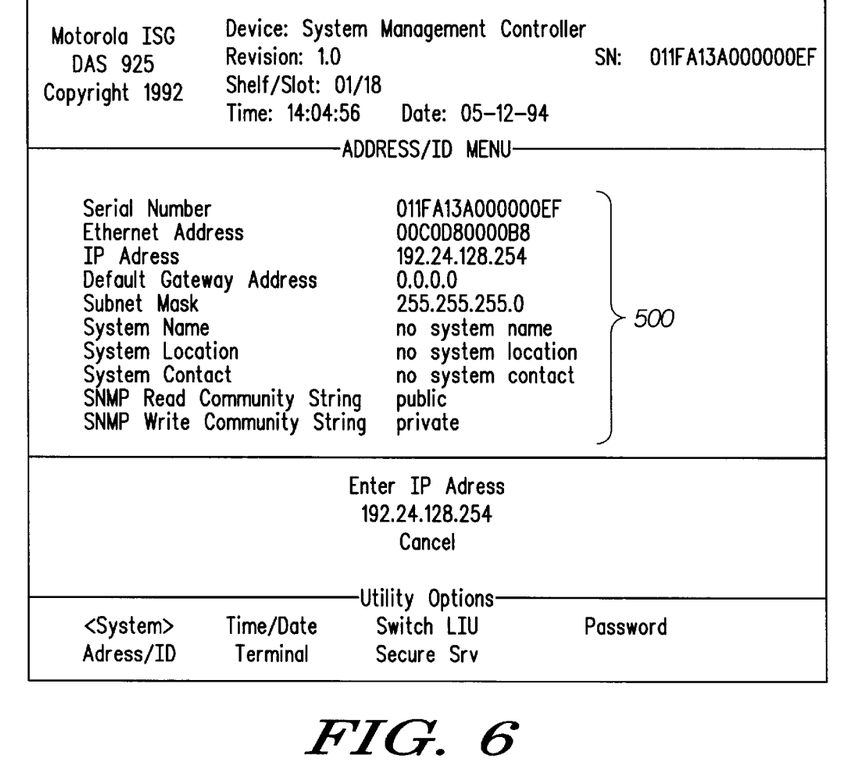
FIG. 6 illustrates a data communication system monitor screen having controller configuration information.

FIG. 6 illustrates a monitor screen from a Motorola DAS 925 data communications system controller and indicates controller configuration information 500 under an Address/ ID Menu. The controller configuration information 500 shown on the screen may be stored on one controller configuration information page if the number of bytes for all of the various configuration parameters is equal to or less than 126. The number of bytes for each parameter may be determined by the requirements of the system manager. When controller configuration information is modified, such as an IP address, then the controller information page having that information should be regenerated to include this modified information.

Figure 7:
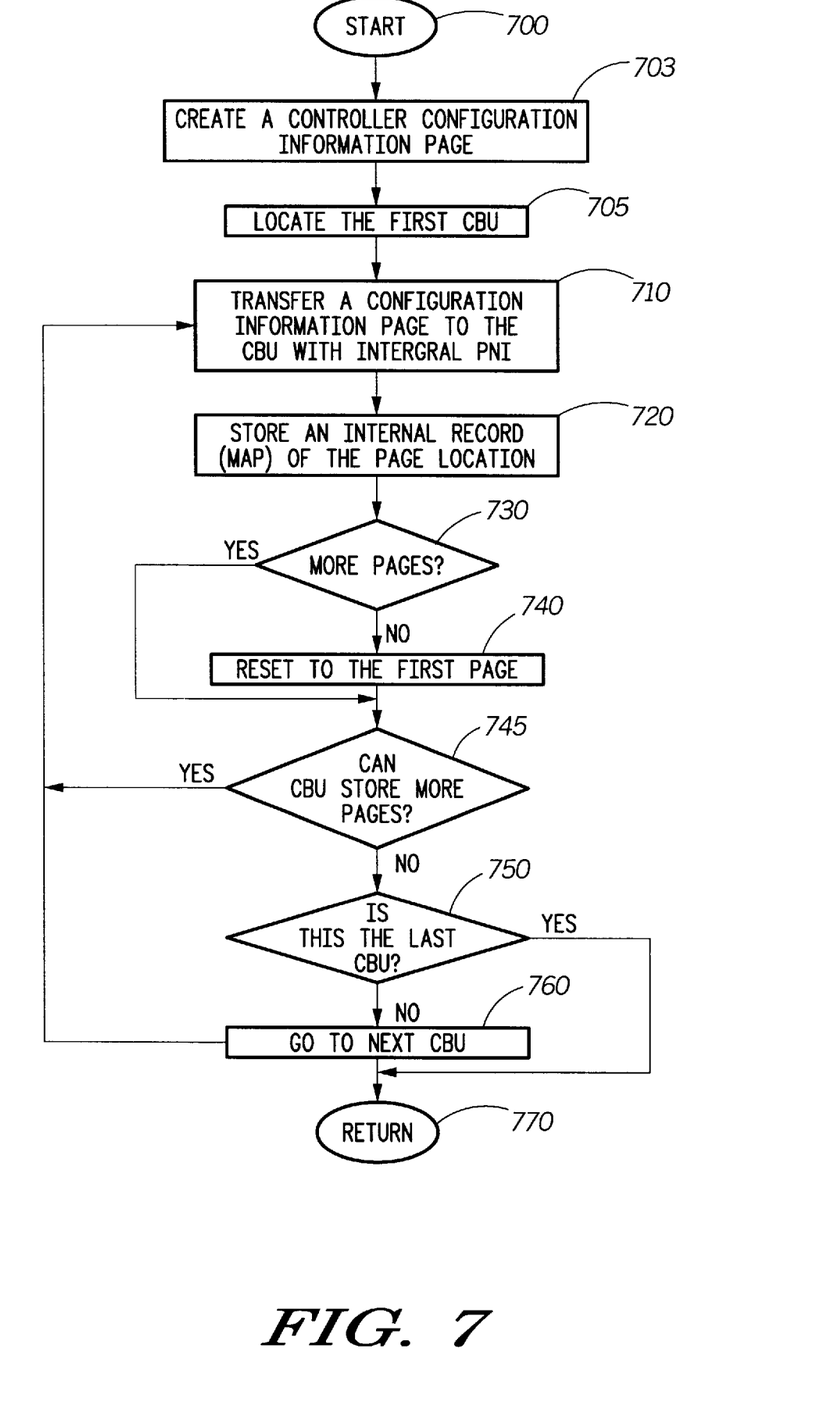
FIG. 7 is a flow chart illustrating a method for distributing controller configuration information in accordance with the present invention.

FIG. 7 is a flow chart illustrating the method used by the controller 214 to distribute the controller configuration pages among the various CBUs 226 when controller configuration either is first stored or is subsequently modified, in accordance with the present invention. When configuration information is modified, the configuration information page containing the modification should be regenerated and transferred to the various CBUs 226. For example, when the controller's network address is modified by a system user, the information stored in the CBUs 226 should be updated.

Continuing to refer to FIG. 7, beginning the process in step 700, the controller 214 creates a controller configuration information page and locates the first CBU 226 listed in a CBU 226 map (FIG. 9), steps 703 and 705. As discussed in more detail below with regard to FIG. 9, the controller 214 will have created a map of CBU locations and will have determined the number of controller configuration pages that each CBU may store via a protocol immediately following system power up.

Next, in step 710, the controller 214 transfers, to the CBU 226, a controller configuration information page containing an embedded PNI. The controller 214 also stores in RAM the location of that particular page within the array of various CBU locations, step 720, and as discussed in detail below, the controller 214 will create page columns within the CBU map. If any more controller configuration information pages are available, i.e., the page just transferred is not the last page of the controller configuration information, step 730, and if the current CBU 226 can accommodate additional pages, step 745, then the transferring and storing steps 710 and 720 are repeated, returning again to step 730. If the last page of controller configuration information had been transferred, the process resets to the first page, and proceeds to step 745, for possible redundant storage of the controller configuration information pages. If the previous page transferred is not the last page and, however, the current CBU 226 cannot accommodate additional pages, then the next CBU 226, if determined to be available in step 750, will be used for storage, step 760, and the process repeats and returns to step 710. The distribution of controller configuration is complete, step 770, after exhausting the storage capacity of each CBU 226 within the data communications system 100.

FIGS. 8a and 8b illustrate the structure of identification protocol frames utilized in the preferred embodiment of the present invention to determine both the availability of a CBU 226 for information storage and the storage capacity (number of pages available) of each available CBU 226. As discussed with reference to FIG. 7, an identification procedure is employed in steps 710, 745, 750 and 760 to locate each available CBU 226 and to store controller configuration information pages up to the capacity of each CBU 226. Formats used in this identification protocol are illustrated in FIGS. 8*a* and 8*b*. The controller 214 sends a request identification frame ("RID" frame), illustrated in FIG. 8*a*, to each local DCD 224 over communications bus 222. In response, the DCD 224 receiving the RID frame transmits a present identification frame ("PID" frame) to the controller 214 over the communications bus 222. The PID frame includes information concerning controller configuration information storage capacity, referred to as CBU page count ("CBUPC"), indicating the number of pages which may be stored in the particular CBU 226.

Figure 9:
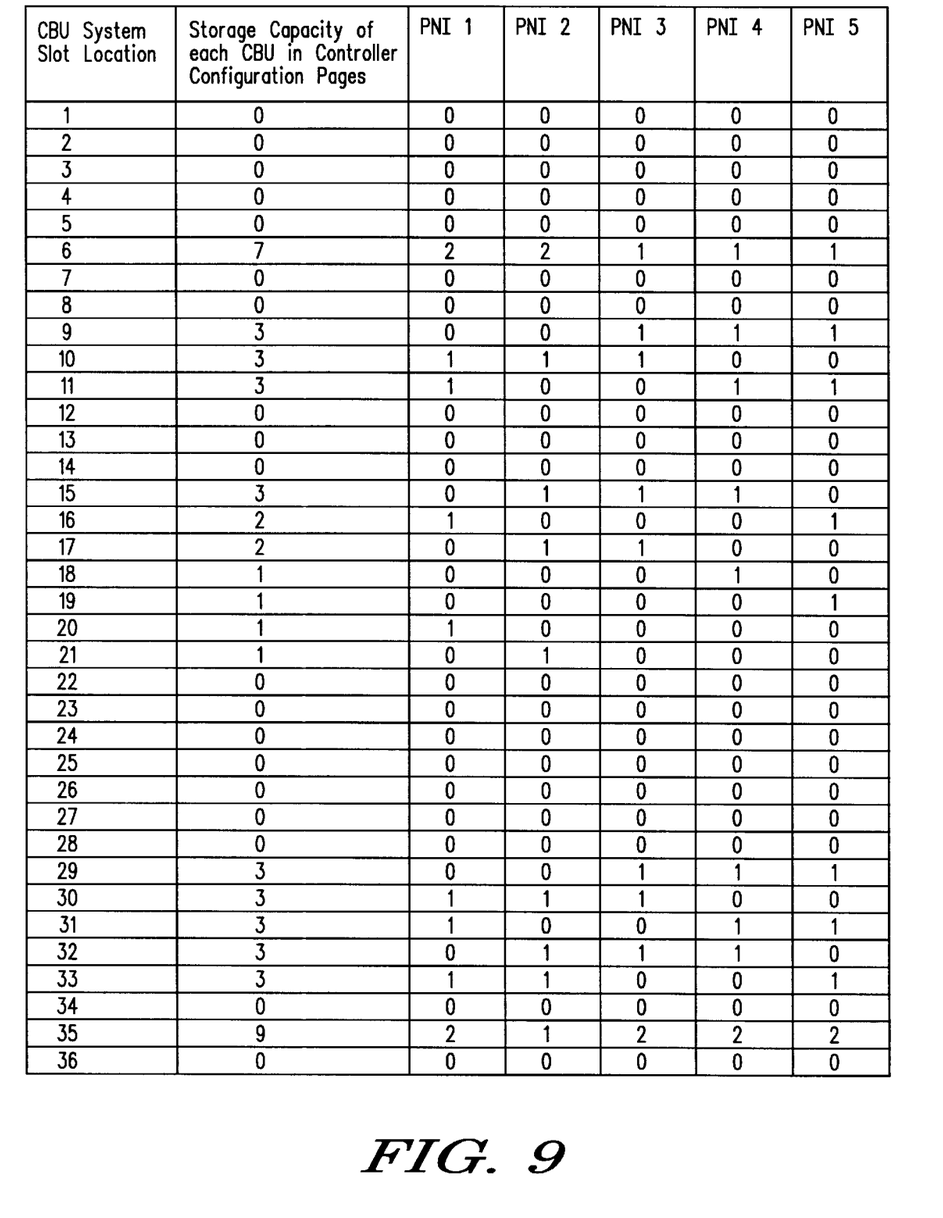
FIG. 9 illustrates a controller map of storage capacity of controller backup units for controller configuration information pages and of possible locations of identified controller configuration information pages in controller backup units, in accordance with the present invention.

By using the identification protocol discussed above to obtain CBU availability and capacity information from each DCD 224, the controller 214 may generate a map of available storage pages, illustrated in FIG. 9. Referring to FIG. 9, the first column of the map contains information concerning CBU 226 (or, equivalently, DCD 224) location, such as slot location in the preferred embodiment. (The CBU slot location is the same as the location of the local DCD 224 in the data communication system, which typically has the slots numbered sequentially.) In the Motorola DAS 925, for example, 36 slots are available and are numbered sequentially 1 through 36. The second column of the table shows the capacity of each CBU 226, by the number of controller configuration information pages which may be stored in each CBU 226. Next, as an example, columns 3 through 7 illustrate page storage locations, and any redundancy, for five pages of controller configuration information. For example, column 3 shows the storage location of the controller information page having the PNI=1. The page having PNI=1 is redundantly stored twice in the CBU located in slot 6, and for a total number of eleven among all of the available CBUs (the total number of times is determined by adding the storage numbers in the PNI=1 column). Also as examples, the CBU located in slot 24 has no available storage capacity and has no pages stored, as indicated by the zeros in all columns, while the CBU in slot 10 stores 3 pages, one each of pages 1, 2 and 3. The map identifies where each controller configuration page 1 through n, identified by the PNI, is stored in the plurality of CBUs 226.

Figure 10A:
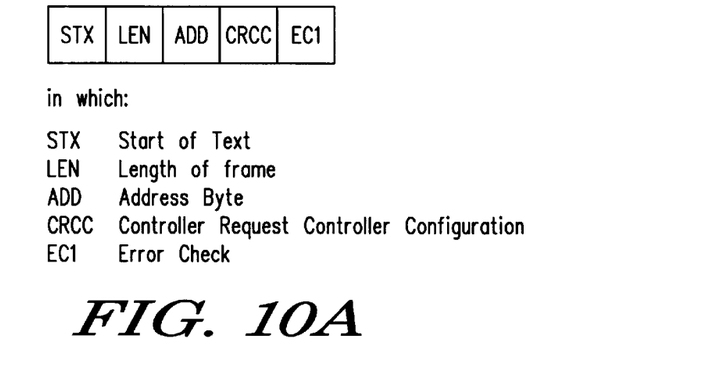
FIG. 10A illustrates the structure of a controller request controller configuration protocol frame in accordance with the present invention.
Figure 10B:
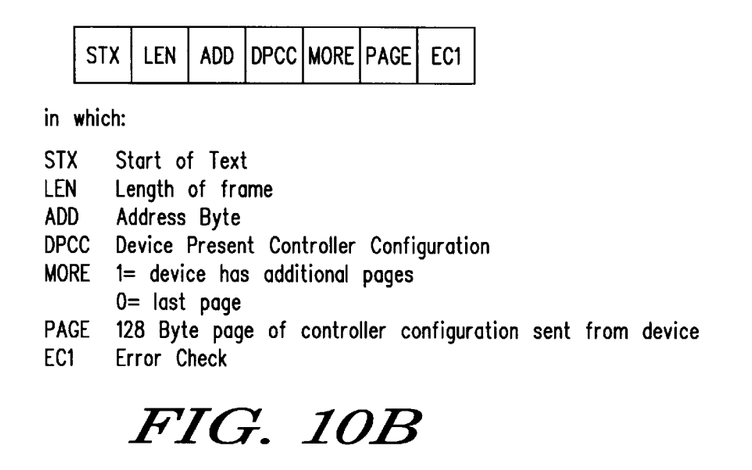
FIG. 10B illustrates the structure of a device present controller configuration protocol frame in accordance with the present invention.
Figure 10C:
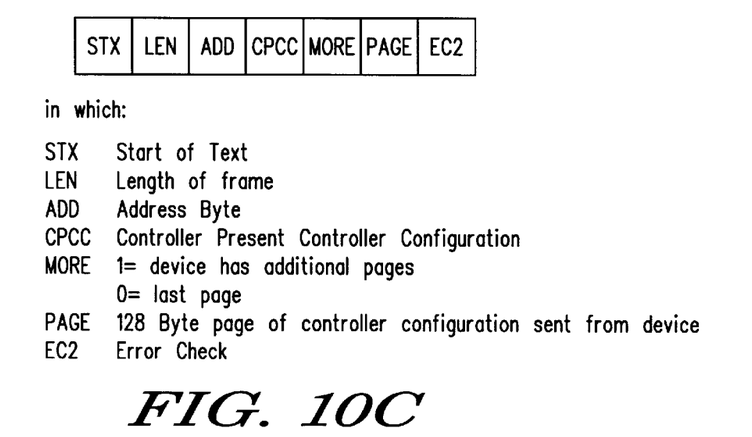
FIG. 10C illustrates the structure of a controller present controller configuration protocol frame in accordance with the present invention.
Figure 11:
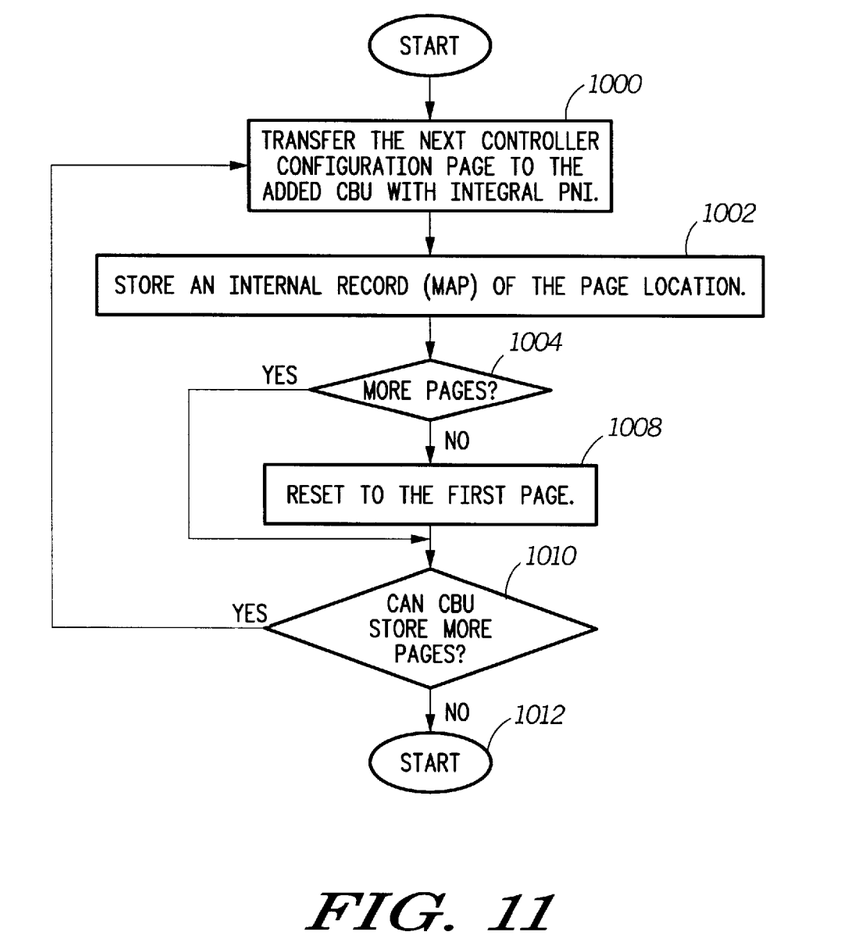
FIG. 11 is a flow chart illustrating a method for utilizing additional controller backup units for distribution of controller configuration information pages in accordance with the present invention.

FIG. 10 illustrates the structure of controller configuration information protocol frames used to transfer controller configuration information pages between the controller 214 and the CBUs 226, as utilized in the storage and retrieval methods illustrated in FIGS. 3, 7 and 11, in the preferred embodiment of the present invention. To obtain controller configuration information pages from the various CBUs 226, the controller, such as a replacement controller, requests such information using, for example, the Controller Request Controller Configuration ("CRCC") frame, illustrated in FIG. 10*a*, transmitted to a particular, addressed CBU 226 over the communications bus 222. In response, the addressed CBU 226 sends a controller configuration information page to the controller, formatted as a Device Present Controller Configuration ("DPCC") frame as illustrated in FIG. 10*b*. Also as illustrated in FIG. 10*b*, if the addressed CBU 226 has additional pages stored, it may indicate such in the DPCC frame (the "MORE" byte). Similarly, as illustrated in FIG. 10*c*, when the controller sends controller configuration information pages to the various CBUs 226, the Controller Present Controller Configuration ("CPCC") frame is used in the preferred embodiment.

Lastly, FIG. 11 illustrates the process used by the controller 214 to distribute the controller configuration information pages among any CBUs 226 which are subsequently added to the data communications system 100. In step 1000, the controller 214 transfers a controller configuration information page which would have been the next page transferred if the previous distribution of controller configuration information had not ended. As in the other distribution process illustrated in FIG. 7, the protocol frame used to transfer controller configuration information pages to the newly added CBU 226 is shown in FIG. 10*c*. Again, the page contains an embedded PNI which is stored in RAM at the location of that particular page within the array of CBU locations (step 1002, FIG. 11). If there are no additional pages to be transferred, i.e., the page transferred was the last of the controller configuration information pages, then the controller resets to the first page (steps 1006 and 1008).

Continuing to refer to FIG. 11, if there are any additional controller configuration pages available for storage, i.e., the page transferred was not the last page of the controller configuration information, step 1004, and if the current CBU 226 can accommodate additional pages, step 1010, then the transferring and storing processes are repeated, returning to step 1000. If the page transferred is not the last page and, however, the current CBU 226 cannot accommodate additional pages, then transfer of controller configuration information pages to the added CBU is complete, step 1012.

Conversely, if a CBU 226 is removed from the data communications system 100, then the controller configuration is redistributed by executing the distribution method, illustrated in FIG. 7, beginning with start step 700.

In summary, the apparatus embodiment of the present invention may be described as an apparatus for storing and restoring controller configuration information in a data communications system. The apparatus comprises, first, a first random access memory such as CBU 226; and second, a controller (214 or 228) coupleable to the first random access memory, in which the controller has a second random access memory such as NVRAM 220. The controller is responsive to create a controller configuration information page such as 390 from controller configuration information and to store the controller configuration information page in the second random access memory 220. The controller (214 or 228) is further responsive to transfer the controller configuration information page 390 to the first random access memory and to receive the controller configuration information page from the first random access memory to form a received controller configuration information page. The controller (214 or 228) is further responsive to determine the validity of controller configuration information contained in the received controller configuration information page to form a valid received controller configuration information page and to store the valid received controller configuration information page in the second random access memory such as NVRAM 220. Also in accordance with the present invention, the data communications system may have a plurality of data communications devices 224 and the first random access memory may be considered to be distributed among the plurality of data communications devices as CBUs 226.

Also as discussed above, in accordance with the present invention, the controller (214 or 228) is further responsive to transmit an identification request (FIG. 8*a*) to each of the plurality of data communications devices 226 to form a plurality of identified data communications devices. Then, each of the plurality of data communications devices is responsive, to the identification request from the controller, to transmit identification information and controller configuration information page storage capacity information to the controller (FIG. 8b). In addition, the controller is further responsive to determine whether a first identified controller configuration information page from a plurality of identified controller configuration information pages both has been received from the first random access memory and contains valid controller configuration information, and if the first identified controller configuration information page is not both received and valid, to substitute predetermined controller configuration information, such as factory default information, for the controller configuration information contained in the first identified controller configuration information page.

Also as discussed above with regard to FIG. 9, the controller is further responsive to identify each of the plurality of controller configuration information pages to form a plurality of identifiable controller configuration information pages and to determine an address location, such as by system slot location, of each of the plurality of identifiable controller configuration information pages among a plurality of data communications devices.

Similarly, the apparatus embodiment of the present invention may also be described as an apparatus for providing controller configuration information backup in a data communications system. The apparatus comprises, first, a plurality of data communications devices 224 having backup memory 226 for storing a predetermined amount of a plurality of controller configuration information pages; second, a sensor 216 coupleable to the plurality of data communications devices, the sensor responsive to determine validity of the plurality of controller configuration information pages; third, a processor coupled to the sensor, the processor having a processor memory, the processor 218 responsive to sequentially sort and store a plurality of valid controller configuration information pages in the processor memory to form sequentially sorted valid controller configuration information pages; and fourth, a nonvolatile memory 220 coupled to the processor, the nonvolatile memory having capacity to receive and store the sequentially sorted valid controller configuration information pages. In this embodiment, moreover, the sensor 216, the processor 218, and the nonvolatile memory 220 may be implemented as a controller (214 or 228).

Also in summary, and as discussed above with regard to FIG. 3, the various method embodiments of the present invention may be described as a method of restoring controller configuration information in a data communications system having a plurality of data communications devices, with the plurality of data communications devices having a plurality of controller configuration information pages stored therein. The method then consists of, first, locating a first data communications device having a first controller configuration information page (step 340), and second, retrieving the first controller configuration information page from the first data communications device (step 342). The method continues by determining whether the first data communications device contains an additional controller configuration information page, and for each additional controller configuration information page, if any, retrieving the additional controller configuration information page (step 352). The method then repeats for each data communications device of the plurality of data communications devices having any of the plurality of controller configuration information pages (steps 354 and 356). During this process, the method also determines the validity of each retrieved controller configuration information page to form a plurality of valid controller configuration information pages (steps 344, 348, and 350). Lastly, the method restores controller configuration information to a controller from the plurality of valid controller configuration information pages (step 364). The method may also include substituting default controller configuration information for an invalid controller configuration information page and including the default controller configuration information in the controller configuration information restored to the controller (steps 360 and 362).

Similarly, the method of storing controller configuration information in a data communications system having a plurality of data communications devices may also be described as, first, creating a plurality of controller configuration information pages from controller configuration information (step 703), and identifying a first data communications device having storage capacity for a first controller configuration information page (step 705). Next, the method stores the first controller configuration information page in the first data communications device (step 710), and determines whether the first data communications device has an additional capacity to store a plurality of additional controller configuration information pages (step 745), and if the first data communications device has the additional capacity, storing in the first data communications device an amount of additional controller configuration information pages, of the plurality of additional controller configuration information pages, determined by the additional capacity (steps 730 and 740). The process is repeated for each data communications device of the plurality of data communications devices having storage capacity (steps 750 and 760).

Also as discussed with reference to FIGS. 4 and 5, the storing method may include creating a controller configuration information page by creating a page identification; formatting controller configuration information, such as in bytes 2–127; creating error detection information, such as a checksum; and creating a controller configuration information page from the page identification, the formatted controller configuration information, and the error detection information. In order to store as much of the controller configuration as reasonably possible or practical, this process may also be repeated to form a plurality of controller configuration information pages.

In addition, the storage method may also include transmitting an identification request to each of the plurality of data communications devices to form a plurality of identified data communications devices (FIG. 8a); and receiving identification information and controller configuration information page storage capacity information from each of the plurality of identified data communications devices (FIG. 8b).

The mapping part of the process, referred to as step 720 of FIG. 7 and illustrated as FIG. 9, consists of identifying each controller configuration information page of the plurality of controller configuration information pages to form a plurality of identified controller configuration information pages, such as by sequential numbering; determining an address location for each data communication device of the plurality of data communications devices to form a plurality of address locations, such as system slot locations; and mapping to each identified controller configuration information page of the plurality of identified controller configuration information pages, the address location of the plurality of address locations which corresponds to a data communications device of the plurality of data communications device in which the identified controller configuration information page has been stored, such as the array format illustrated in FIG. 9.

A significant advantage of a controller configuration backup method and apparatus in accordance with the present invention is that a data communication system incorporating the invention is "stand alone", i.e., the system does not require a separate or additional network device (such as a workstation or computer) to store controller configuration information. Another significant advantage of the present invention is that the controller may be replaced while the communication system is operating, thus avoiding any disruption of data communication connections.

Another major advantage of the controller configuration backup method and apparatus, in accordance with the present invention, is the effective utilization of a previously unrecognized capacity, namely, the utilization of any excess memory capacity of DCDs as distributed memory which functions as the CBUs. Although the amount of excess memory available on each DCD depends on both the data communications functional requirements and the amount of resident memory, each DCD may provide a portion of memory for the controller configuration backup function. The total memory available from all the DCDs typically may allow for redundant storing of multiple copies of each controller configuration information page, and with a sufficient number of DCDs, it is highly unlikely that any memory shortage would result. Accordingly, this distributed controller backup method and apparatus of the present invention provides for high reliability, with storage of multiple copies, coupled with cost reduction, as no additional network devices are required.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. An apparatus for storing and restoring controller configuration information in a data communications system, the apparatus comprising:

a first random access memory external to a controller;

the controller coupleable to the first random access memory, the controller having a second random access memory, the controller responsive to create a plurality of controller configuration information pages containing the controller configuration information and to store the controller configuration information pages in the second random access memory; the controller further responsive to transfer the controller configuration information pages to the first random access memory for external storage to enable later restoration of the controller configuration information and to receive the controller configuration information pages from the first random access memory to form received controller configuration information pages when the controller information is restored;

wherein the first random access memory includes a plurality of data communications devices among which the controller configuration information pages are distributed.

2. The apparatus of claim 1 wherein the controller is further responsive to determine validity of the controller configuration information contained in the received controller configuration information pages to form valid received controller configuration information pages and to store the valid received controller configuration information page in the second random access memory.

3. The apparatus of claim 2 wherein the controller is further responsive to transmit an identification request to each of the plurality of data communications devices to form a plurality of identified data communications devices.

4. The apparatus of claim 3 wherein each of the plurality of data communications devices is responsive, to the identification request from the controller, to transmit identification information and controller configuration information page storage capacity information to the controller.

5. The apparatus of claim 2 wherein the controller is further responsive to determine whether a first identified controller configuration information page from the plurality of controller configuration information pages both has been received from the first random access memory and contains valid controller configuration information, and if the first identified controller configuration information page is not both received and valid, to substitute predetermined controller configuration information for the controller configuration information contained in the first identified controller configuration information page.

6. The apparatus of claim 2 wherein the controller is further responsive to determine the validity of controller configuration information using an error detection protocol.

7. The apparatus of claim 6 wherein the error detection protocol is a checksum algorithm.

8. The apparatus of claim 1 wherein each controller configuration information page comprises:

a page identification;

formatted controller configuration information; and error detection information.

9. The apparatus of claim 8 wherein the controller is further responsive to identify each of the plurality of controller configuration information pages to form a plurality of identifiable controller configuration information pages and to determine an address location of each of the plurality of identifiable controller configuration information pages among a plurality of data communications devices.

10. The apparatus of claim 8 wherein the controller is further responsive to sequentially sort the plurality of controller configuration information pages by the page identification.

11. The apparatus of claim 8 wherein each of the plurality of controller configuration information pages has a predetermined size.

12. A method of restoring controller configuration information in a data communications system having a plurality of data communications devices, the plurality of data communications devices having a plurality of controller configuration information pages stored therein, the method comprising:

(a) locating a first data communications device having a first controller configuration information page;

(b) retrieving the first controller configuration information page from the first data communications device;

(c) determining whether the first data communications device contains an additional controller configuration information page, and for each additional controller configuration information page, if any, retrieving the additional controller configuration information page;

(d) repeating steps (a), (b) and (c) for each data communications device of the plurality of data communications devices having any of the plurality of controller configuration information pages;

(e) determining validity of each controller configuration information page retrieved in steps (b) through (d), inclusive, to form a plurality of valid controller configuration information pages; and (f) restoring controller configuration information to a controller from the plurality of valid controller configuration information pages.

13. The method of claim 12, further comprising:

(g) substituting default controller configuration information for an invalid controller configuration information page and including the default controller configuration information in the controller configuration information restored to the controller in step (f).

14. The method of claim 12, wherein step (e) further comprises using an error detection protocol.

15. The method of claim 12, wherein step (e) further comprises using a checksum algorithm.

16. The method of claim 12, wherein step (e) further comprises:

(e1) forming a sum of bytes of a controller configuration information page retrieved in steps (b) through (d), inclusive;

(e2) inverting a least significant byte of the sum;

(e3) forming a checksum byte by adding a binary one to the inverted least significant byte;

(e4) indicating a valid controller configuration page if the checksum byte is zero; and (e5) repeating steps (e1) through (e4), inclusive, for each controller configuration information page of the plurality of controller configuration information pages retrieved in steps (b) through (d), inclusive.

17. The method of claim 12, wherein step (f) further comprises:

(f1) identifying each controller configuration information page of the plurality of valid controller configuration information pages;

(f2) sorting each controller configuration information page identified in step (f1); and (f3) storing each controller configuration information page sorted in step (f2).

* * * * *